(12) United States Patent
Hong et al.

(10) Patent No.: US 10,019,604 B2
(45) Date of Patent: Jul. 10, 2018

(54) METHOD AND APPARATUS OF VERIFYING TERMINAL AND MEDIUM

(71) Applicant: Xiaomi Inc., Beijing (CN)

(72) Inventors: Feng Hong, Beijing (CN); Junqi Lin, Beijing (CN); Yifan Zhu, Beijing (CN)

(73) Assignee: Xiaomi Inc., Beijing (CN)

( * ) Notice: Subject to any disclaimer, the term of this patent is extended or adjusted under 35 U.S.C. 154(b) by 274 days.

(21) Appl. No.: 14/841,098

(22) Filed: Aug. 31, 2015

(65) Prior Publication Data

US 2016/0125203 A1 May 5, 2016

Related U.S. Application Data

(63) Continuation of application No. PCT/CN2015/071248, filed on Jan. 21, 2015.

(30) Foreign Application Priority Data

Oct. 31, 2014 (CN) .......................... 2014 1 0602394

(51) Int. Cl.
*H04L 9/32* (2006.01)
*G06F 21/73* (2013.01)
(Continued)

(52) U.S. Cl.
CPC ............ *G06F 21/73* (2013.01); *G06F 21/606* (2013.01); *H04L 63/0869* (2013.01); *H04L 63/0876* (2013.01)

(58) Field of Classification Search
CPC ... G06F 21/73; G06F 21/606; H04L 63/0869; H04L 63/0876
See application file for complete search history.

(56) References Cited

U.S. PATENT DOCUMENTS 8,346,287 B2 * 1/2013 King .................... H04L 63/062
380/249
8,412,634 B2 4/2013 Fujisawa et al.
(Continued)

FOREIGN PATENT DOCUMENTS

CN 1541015 A 10/2004
CN 1697424 A 11/2005
(Continued)

OTHER PUBLICATIONS

International Search Report dated Jul. 28, 2015 for corresponding International Application No. PCT/CN2015/071248, 5 pages.
(Continued)

*Primary Examiner* — Sharon Lynch
(74) *Attorney, Agent, or Firm* — Arch & Lake LLP

(57) ABSTRACT

A method and an apparatus of verifying a terminal are provided in the field of computer technology. In the method, the terminal establishes a secure channel with a server through a secure element in the terminal. The terminal sends original terminal hardware parameters in the secure element to the server through the secure channel by using the secure element, where the server is configured to feed back identification information according to the terminal hardware parameters. The terminal then determines a verification result of an authenticity of the terminal according to the identification information fed back by the server. The apparatus includes: a channel establishing module, a parameter sending module and a result determining module. The present disclosure solves the problem that the verification application program cannot identify the authenticity of the terminal due to the degradation of the terminal performance, and achieves the effect that the accuracy of the authenticity of verifying the terminal is improved.

12 Claims, 3 Drawing Sheets

(51) Int. Cl.
  G06F 21/60 (2013.01)
  H04L 29/06 (2006.01)

(56) References Cited

U.S. PATENT DOCUMENTS

| | | | | |
|---|---|---|---|---|
| 8,503,376 | B2* | 8/2013 | Cha | H04L 63/0428 370/329 |
| 8,631,239 | B2* | 1/2014 | Djabarov | G06F 9/44 713/168 |
| 8,832,439 | B2* | 9/2014 | Djabarov | G06F 9/44 713/168 |
| 8,850,543 | B2* | 9/2014 | Von Bokern | H04L 63/102 726/1 |
| 9,055,427 | B2* | 6/2015 | Gehrmann | H04L 63/0442 |
| 9,268,555 | B2* | 2/2016 | Djabarov | G06F 9/44 |
| 9,294,478 | B2* | 3/2016 | Von Bokern | H04L 63/102 |
| 9,467,292 | B2* | 10/2016 | Nahari | H04L 9/3218 |
| 9,509,686 | B2* | 11/2016 | Anantha | H04L 9/0897 |
| 9,678,741 | B2* | 6/2017 | Djabarov | G06F 8/65 |
| 9,722,804 | B2* | 8/2017 | Miller | H04L 9/3271 |
| 2004/0043792 | A1* | 3/2004 | Simmons | H04M 15/47 455/558 |
| 2006/0095454 | A1* | 5/2006 | Shankar | G06F 21/602 |
| 2007/0095927 | A1* | 5/2007 | Pesonen | G07F 7/1008 235/492 |
| 2007/0135094 | A1 | 6/2007 | Takae et al. | |
| 2008/0107269 | A1* | 5/2008 | Gehrmann | H04L 63/0442 380/270 |
| 2008/0117889 | A1* | 5/2008 | Moitrel | H04W 12/12 370/345 |
| 2009/0209232 | A1* | 8/2009 | Cha | H04L 63/0428 455/411 |
| 2009/0307142 | A1* | 12/2009 | Mardikar | G06Q 20/1085 705/72 |
| 2010/0306531 | A1 | 12/2010 | Nahari | |
| 2011/0093703 | A1* | 4/2011 | Etchegoyen | G06F 21/57 713/168 |
| 2011/0117881 | A1* | 5/2011 | Luoma | H04L 63/08 455/410 |
| 2012/0144201 | A1* | 6/2012 | Anantha | H04L 9/0897 713/172 |
| 2012/0252531 | A1* | 10/2012 | King | H04L 63/062 455/558 |
| 2012/0303310 | A1* | 11/2012 | Musfeldt | H04L 9/3234 702/123 |
| 2013/0185548 | A1* | 7/2013 | Djabarov | H04L 41/082 713/2 |
| 2013/0185563 | A1* | 7/2013 | Djabarov | G06F 9/44 713/176 |
| 2013/0276019 | A1 | 10/2013 | Lin | |
| 2014/0066015 | A1* | 3/2014 | Aissi | H04W 12/06 455/411 |
| 2014/0095857 | A1* | 4/2014 | Djabarov | G06F 9/44 713/2 |
| 2014/0115340 | A1 | 4/2014 | Lee | |
| 2014/0181892 | A1* | 6/2014 | Von Bokern | H04L 63/102 726/1 |
| 2014/0317614 | A1* | 10/2014 | Djabarov | G06F 9/44 717/173 |
| 2015/0195281 | A1* | 7/2015 | Venkataramu | H04L 63/0884 726/3 |
| 2015/0200937 | A1* | 7/2015 | Von Bokern | H04L 63/102 726/7 |
| 2015/0222631 | A1* | 8/2015 | Chastain | H04L 9/3273 713/155 |
| 2015/0288521 | A1* | 10/2015 | Nahari | H04L 9/3218 713/170 |
| 2016/0117166 | A1* | 4/2016 | Djabarov | G06F 9/44 717/173 |
| 2016/0171206 | A1* | 6/2016 | Von Bokern | H04L 63/102 726/1 |
| 2016/0277930 | A1* | 9/2016 | Li | H04L 41/28 |
| 2017/0048232 | A1* | 2/2017 | Anantha | H04L 9/0897 |

FOREIGN PATENT DOCUMENTS

| | | |
|---|---|---|
| CN | 1764106 A | 4/2006 |
| CN | 1764106 A | 4/2006 |
| CN | 1806221 A | 7/2006 |
| CN | 101075326 A | 11/2007 |
| CN | 101075326 A | 11/2007 |
| CN | 201051271 Y | 4/2008 |
| CN | 101452539 A | 6/2009 |
| CN | 101452539 A | 6/2009 |
| CN | 101504731 A | 8/2009 |
| CN | 101552999 A | 10/2009 |
| CN | 101741842 A | 6/2010 |
| CN | 101969446 A | 2/2011 |
| CN | 101969446 A | 9/2011 |
| CN | 102547688 A | 7/2012 |
| CN | 102547688 A | 7/2012 |
| CN | 102780989 A | 11/2012 |
| CN | 103065168 A | 4/2013 |
| CN | 103646044 A | 3/2014 |
| CN | 103841239 A | 6/2014 |
| CN | 103870851 A | 6/2014 |
| EA | 016997 B1 | 9/2012 |
| EP | 2595082 A1 | 5/2013 |
| JP | 2000050858 A | 2/2000 |
| JP | 2011197912 A | 10/2011 |
| JP | 2012009938 A | 1/2012 |
| JP | 2013008378 A | 1/2013 |
| JP | 2013524385 A | 6/2013 |
| JP | 2014075841 A | 4/2014 |
| KR | 20090081945 A | 7/2009 |
| KR | 20140098872 A | 8/2014 |
| RU | 2354066 C2 | 4/2009 |
| WO | 2007073609 A1 | 7/2007 |
| WO | 2014184899 A1 | 11/2014 |

OTHER PUBLICATIONS

Xin Guang Tian etal., "*Masquerade Prevention of Mobile Telephones Based on Bidirectional Information Verification Mechanism*", Journal of Jilin University (Information Science Edition) vol. 27, No. 4, Jul. 2009, (pp. 366-370).

International Search Report (including English translation) issued in corresponding International Application No. PCT/CN2015/071248, dated Jul. 28, 2015, 4 pages.

Notification of Reason for Refusal (including English translation) issued in corresponding Korean Patent Application No. 10-2015-7007199, dated Oct. 30, 2015, 9 pages.

Extended European search report issued in corresponding European Application No. 15191947.9, dated Jan. 28, 2016, 7 pages.

Official Action (including English translation) issued in corresponding Russian Patent Application No. 2015111264/07(017544), dated Jun. 10, 2016, 10 pages.

First Office Action (including English translation) issued in corresponding Chinese Patent Application No. 201410602394.8, dated Dec. 12, 2016, 16 pages.

Notification of Reasons for Refusal (including English translation) issued in corresponding Japanese Patent Application No. 2016-555887, dated Dec. 27, 2016, 5 pages.

Tian Xin Guang et al., "Masquerade Prevention of Mobile Telephones Based on Bidirectional Information Verification Mechanism," "Journal of Jilin University (Information Science Edition)", vol. 27 No. 4, Jul. 2009, pp. 366-370.

* cited by examiner

METHOD AND APPARATUS OF VERIFYING TERMINAL AND MEDIUM

The present application is a continuation of International Application No. PCT/CN2015/071248, filed on Jan. 21, 2015, which is based upon and claims priority to Chinese Patent Application No. 201410602394.8, filed on Oct. 31, 2014, the entire contents of which are incorporated herein by reference.

TECHNICAL FIELD

The present disclosure relates to a field of computer technology, and more particularly to a method and an apparatus of verifying a terminal.

BACKGROUND

With the continuous replacement of a terminal by a user, some manufacturers will extract used parts from the terminals abandoned by the user and the extracted parts will be assembled into a terminal for sale. Since the performance of such terminals including used parts is unstable, the user needs to verify a purchased terminal, so as to identify an authenticity of the terminal.

If a verification application program is installed in a terminal, the terminal may run the verification application program, and read terminal hardware parameters, which include model number, serial number, IMEI (International Mobile Equipment Identity) number, memory, CPU parameters and camera parameters and the like, from CPU (Central Processing Unit) of the terminal through the verification application program. The verification application program compares terminal hardware parameters with reference hardware parameters of a known genuine terminal. The verification application program then calculates a score of the terminal hardware parameters and determines the authenticity of the terminal according to the calculated score.

SUMMARY

According to a first aspect of the embodiments of the present disclosure, there is provided a method of verifying a terminal, including: establishing a secure channel with a server through a secure element in the terminal; sending original terminal hardware parameters in the secure element to the server through the secure channel by using the secure element, the server being configured to feed back identification information according to the terminal hardware parameters; and determining a verification result of an authenticity of the terminal according to the identification information fed back by the server.

According to a second aspect of the embodiments of the present disclosure, there is provided an apparatus of verifying a terminal. The apparatus includes: a processor; and a memory for storing instructions executable by the processor. The processor is configured to: establish a secure channel with a server through a secure element in the terminal; send original terminal hardware parameters in the secure element to the server through the secure channel by using the secure element, the server being configured to feed back identification information according to the terminal hardware parameters; and determine a verification result of an authenticity of the terminal according to the identification information fed back by the server.

According to a third aspect, there is provided a non-transitory computer readable storage medium, when instructions in the storage medium are executed by the processor of a terminal, the terminal may execute a method for verifying a terminal. The method includes: establishing a secure channel with a server through a secure element in the terminal; sending original terminal hardware parameters in the secure element to the server through the secure channel by using the secure element, the server being configured to feed back identification information according to the terminal hardware parameters; and determining a verification result of an authenticity of the terminal according to the identification information fed back by the server.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

In the process of implementing the present disclosure, it is found that at least the following problems exist in the current verification methods. First, the calculated score based on computation performance may not be reliable because the performance of a terminal may vary because of many factors including: ambient temperature, chip temperature, and the number of running applications in the terminal. For example, the performance may be degraded due to the consecutive usage over a long time. Thus, the calculated score of the terminal hardware parameters may drop because of the degraded performance, which may result that the verification application program cannot identify the authenticity of the terminal.

The solutions provided by the embodiments of the present disclosure may include the following advantageous effects:

By establishing the secure channel with the server through the secure element in the terminal, the terminal may send the original terminal hardware parameters in the secure element to the server through the secure channel by using the secure element. The server is configured to feed back the identification information according to the terminal hardware parameters. The server may reliably determine a verification result of an authenticity of the terminal according to the identification information fed back by the server. The terminal hardware parameters are initially written into the secure element and do not change with the degradation of the terminal performance. Thus, the accuracy of the terminal hardware parameters is ensured, the problem that the verification application program cannot identify the authenticity of the terminal due to the degradation of the terminal performance is solved. The effect that the accuracy of the authenticity of verifying the terminal is improved is achieved. In addition, the terminal hardware parameters may be directly read to identify the authenticity of the terminal without calculating the score of the terminal hardware parameters, whereby an operation of identifying the authenticity of the terminal is simplified, and the verification efficiency of the terminal is improved.

It is to be understood that the embodiments are exemplary and explanatory only and are not restrictive of the invention, as claimed.

Reference are now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
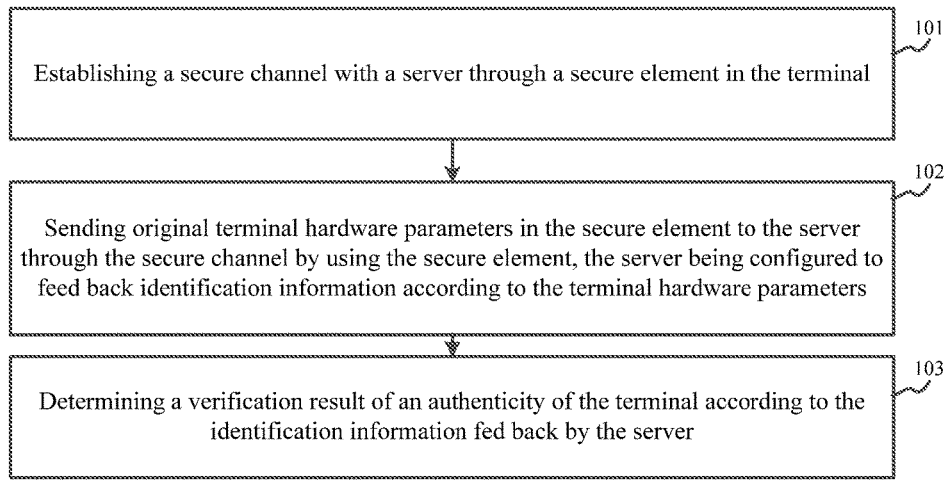
FIG. 1 is an example flow chart showing a method of verifying a terminal according to an exemplary embodiment.

FIG. 1 is an example flow chart showing a method of verifying a terminal according to an exemplary embodiment. The method of verifying the terminal is applied into a terminal. As shown in FIG. 1, the method of verifying the terminal includes the following steps.

In step 101, a secure channel is established with a server through a secure element in the terminal.

The secure element may be an element installed in the terminal. Since the terminal has no authority to read data in the secure element, the terminal may establish the secure channel with the secure element through the server, and then acquire the data in the secure element through the server. Herein, the secure channel is a channel established between the secure element and the server, and is used for data communication between the secure element and the server.

In step 102, original terminal hardware parameters in the secure element are sent to the server through the secure channel by using the secure element. For example, the secure element may be an independent hardware chip in the terminal. The independent hardware chip may include a circuit element disposed directly on a motherboard of the terminal. The independent hardware chip may be configured to encode terminal hardware parameters into an encoded message using a key received from an application installed on the terminal. The application software may then send the encoded message to a server. The server may be configured to send feedback identification information according to the terminal hardware parameters.

The terminal hardware parameters refer to hardware parameters of the terminal, and are used in identifying the authenticity of the terminal.

In this embodiment, the terminal hardware parameters may be stored in the secure element in advance, and the secure element may send the terminal hardware parameters to the server through the secure channel after the secure channel is established between the secure element and the server. Since the terminal hardware parameters acquired by the server are stored initially in the secure element, rather than acquired in real time by the detection of the performance of the terminal, the terminal hardware parameters may not change with the degradation of the terminal performance, whereby the accuracy of the terminal hardware parameters is ensured.

In step 103, a verification result of an authenticity of the terminal is determined according to the identification information fed back by the server.

The terminal may directly identify the authenticity of the terminal according to the identification information rather than score the terminal hardware parameters, an operation of identifying the authenticity of the terminal is simplified, and the verification efficiency of the terminal is improved.

Accordingly, in the method of verifying the terminal provided by the present disclosure by establishing the secure channel with the server through the secure element in the terminal, sending the original terminal hardware parameters in the secure element to the server through the secure channel by using the secure element, the server being configured to feed back the identification information according to the terminal hardware parameters, and determining a verification result of an authenticity of the terminal according to the identification information fed back by the server, the terminal hardware parameters are initially written into the secure element, and may not change with the degradation of the terminal performance, whereby the accuracy of the terminal hardware parameters is ensured, the problem that the verification application program cannot identify the authenticity of the terminal due to the degradation of the terminal performance is solved, and the effect that the accuracy of the authenticity of verifying the terminal is improved is achieved. In addition, the terminal hardware parameters may be directly read to identify the authenticity of the terminal without calculating the score of the terminal hardware parameters, whereby an operation of identifying the authenticity of the terminal is simplified, and the verification efficiency of the terminal is improved.

Figure 2:
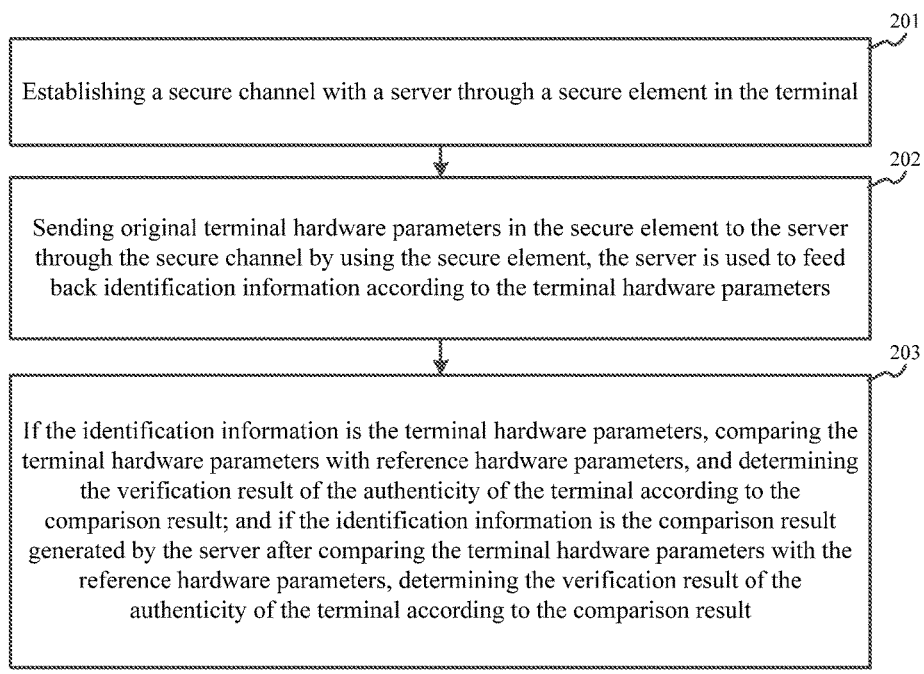
FIG. 2 is an example flow chart showing a method of verifying a terminal according to another exemplary embodiment.

FIG. 2 is an example flow chart showing a method of verifying a terminal according to another exemplary embodiment. The method of verifying the terminal is applied in a terminal. As shown in FIG. 2, the method of verifying the terminal includes the following steps.

In step 201, a secure channel is established with a server through a secure element in the terminal.

The secure element may be an element installed in the terminal. For example, the secure element may include a circuit element built in a chip of the terminal, and may also be built in a hardware component and installed in the terminal through the accessories. For example, the secure element may be built in a SIM (Subscriber Identity Module) card, or the secure element may be built in a Micro SD (Micro Secure Digital Memory card). Certainly, the secure element may also be built in other accessories in the terminal. The embodiments do not confine the format of the secure element included in the accessories.

Since the terminal has no authority to read the data in the secure element, the terminal may establish the secure channel with the secure element through the server, and acquire the data in the secure element through the server. Thus, the secure channel may be a channel established between the secure element and the server, which is used for data communication between the secure element and the server.

Herein, the establishing the secure channel with the server through the secure element in the terminal may include:

1) sending a request for establishing a secure channel to the server through the secure element;

2) receiving a selection command sent by the server according to the request for establishing the secure channel through the secure element, and responding to the selection command which is used to instruct the server to communicate with the secure element;

3) carrying out a mutual verification with the server through the secure element; and 4) establishing the secure channel through the secure element after the mutual verification is passed.

If a user needs verify the authenticity of the terminal, a predetermined application program installed in the terminal may be initiated, the terminal sends a secure channel establishing command to the secure element through the predetermined application program, and the secure element triggers the process of establishing the secure channel under the instruction of the secure channel establishing command.

When the secure channel is established, the secure element may acquire its own secure element identification, carry the secure element identification in the request for establishing the secure channel and send it to the server, wherein the request for establishing the secure channel is used to instruct the secure element to request to establish the secure channel. The server reads the secure element identification from the received request for establishing the secure channel, adds the secure element identification to SELECT command and sends it to the secure element, the SELECT command being used to instruct the server to communicate with the secure element. The secure element determines that the server may communicate with itself after receiving the selection command, and sends a response that the secure element is ready. The server triggers the process of the mutual verification between the server and the secure element after receiving the response, and the secure channel is established between the secure element and the server after the mutual verification is passed. Herein, the mutual verification is used to ensure the security between the secure element and the server.

Alternatively or additionally, the mutual verification with the server through the secure element may include the following act:

1) The terminal may receive first verification information sent by the server through the secure element, where the first verification information may include an initialization update command and a first key value. For example, the first key value may be generated by a random number generator and the first verification information may include the first key value and ciphertext based on the first key value.

2) The terminal may generate second verification information after a verification of the first key value is passed by the secure element and send the second verification to the server, where the second verification information may include a card ciphertext and a second key value generated according to the initialization update command. The terminal may generate the second verification information using the received first key value.

3) The terminal may receive an external authentication command sent by the server through the secure element. The external authentication command may carry a host ciphertext which is generated and sent by the server after a verification of the card ciphertext and the second key value is passed. The verification may be implemented by comparing two key values. Alternatively or additionally, the verification may be implemented by comparing two ciphertexts at least partially based on the key values.

4) The terminal may determine that the mutual verification between the secure element and the server is passed after a verification of the host ciphertext is passed by the secure element.

In the process of the mutual verification, the server adds a first random number generated after receiving the response to the initialization update command. The server may then generate the first key value according to a timestamp, a generated second random number, and fixed character strings. Alternatively or additionally, the server may generate the first key value according to an identification of the secure element. The server may then add the initialization update command and the first key value to the first verification information and sends them to the secure element. Herein, the first key value may include a secure channel key, which is configured to secure the communication channel between the terminal and the server. The secure channel key may include a random number assigned to secure the channel communication.

The secure element verifies the first key value after receiving the first verification information, generates the card ciphertext according to the first random number in the initialization update command after the verification of the first key value is passed. The secure element may then generate the second key value according to the timestamp, the generated card random number and fixed character strings. Alternatively or additionally, the secure element may store at least one key code in its memory and generate the second key value according to the key code. For example, the secure element may select one of the key codes as the second key value. The secure element may add the card ciphertext and the second key value to the second verification information and send them to the server. Herein, the second key value may include the secure channel key.

The server verifies the second key value and the card ciphertext after receiving the second verification information, generates the host ciphertext after the verification of the second key value and the card ciphertext is passed, and adds the host ciphertext to the external authentication command and sends it to the secure element.

The secure element reads the host ciphertext from the external authentication command and verifies the host ciphertext, and determines that the mutual verification between the secure element and the server is passed after the verification of the host ciphertext is passed.

In the embodiments, the secure element needs to verify the first verification information through a key, generate the second verification information and verify the host ciphertext. There may be one or more keys to verify the first verification information. In other words, the number of keys may be one or more. Generally, the key is set before the terminal is originally started, and cannot be modified, whereby the accuracy of the mutual verification may be ensured.

In step 202, original terminal hardware parameters in the secure element are sent to the server through the secure channel by using the secure element, where the server is configured to feed back identification information according to the terminal hardware parameters.

The terminal hardware parameters refer to hardware parameters of the terminal, and are used in identifying the authenticity of the terminal. For example, the terminal hardware parameters may be previously stored in the secure element, the secure element may send the terminal hardware parameters to the server through the secure channel after the secure channel is established between the secure element and the server. Since the terminal hardware parameters acquired by the server are initially stored in the secure element, rather than acquired in real time by the detection of the performance of the terminal, the terminal hardware parameters may not change with the degradation of the terminal performance, whereby the accuracy of the terminal hardware parameters is ensured.

In this embodiment, the terminal hardware parameters are written into the secure element before the terminal is originally started and the terminal hardware parameters are in a read-only state.

In the actual implementation, the terminal hardware parameters may be set by the manufacturers before the terminal leaves the factory, and the terminal hardware parameters of the same batch of terminals are the same. Since the terminal hardware parameters in the secure element are written before the terminal is originally started and the terminal hardware parameters are in a read-only state, the terminal hardware parameters in the secure element cannot be modified in the terminal after the terminal is started by the user. Thus, the problem that the authenticity of the terminal cannot be identified because the terminal hardware parameters in the security element are maliciously modified by the terminal may be avoided, and the effect that the accuracy of the authenticity of verifying the terminal is improved is achieved.

In step 203, if the identification information includes the terminal hardware parameters, the terminal hardware parameters are compared with reference hardware parameters, and the verification result of the authenticity of the terminal is determined according to a comparison result; and if the identification information include a comparison result generated by the server after comparing the terminal hardware parameters with the reference hardware parameters, the verification result of the authenticity of the terminal is determined according to the comparison result.

The server may generate the identification information according to the terminal hardware parameters after receiving the terminal hardware parameters, and send the identification information to the secure element. Then, the secure element may verify the authenticity of the terminal according to the identification information. In this embodiment, the determining a verification result of an authenticity of the terminal according to the identification information fed back by the server includes:

1) if the identification information include the terminal hardware parameters, comparing the terminal hardware parameters with reference hardware parameters, and determining the verification result of the authenticity of the terminal according to a comparison result; and 2) if the identification information include a comparison result generated by the server after comparing the terminal hardware parameters with the reference hardware parameters, determining the verification result of the authenticity of the terminal according to the comparison result.

When the reference hardware parameters of a genuine terminal are not stored in the server and the reference hardware parameters are stored in the terminal, the server may send the received hardware parameters as the identification information to the terminal; the terminal compares the terminal hardware parameters with the reference hardware parameters, and uses the comparison result as the verification result.

When the reference hardware parameters of the genuine terminal are stored in the server, the server may compare the received hardware parameters with the reference hardware parameters and send the comparison result to the terminal, and then the terminal uses the comparison result as the verification result by the terminal Generally, since the server has a faster processing ability than the terminal, the comparing the received hardware parameters with the reference hardware parameters may be implemented by the server and has a faster processing speed, whereby the verification efficiency of the terminal may be improved.

Assuming that the terminal hardware parameters include model number, serial number, IMEI number and memory, the model number, the serial number, the IMEI number and the memory in the terminal hardware parameters may be respectively compared with the model number, the serial number, the IMEI number and the memory in the reference hardware parameters, if the model number, the serial number, the IMEI number and the memory in the terminal hardware parameters are respectively the same with the model number, the serial number, the IMEI number and the memory in the reference hardware parameters, then the same comparison result between the terminal hardware parameters and the reference hardware parameters is obtained, and the terminal is determined as a genuine terminal according to the comparison result.

In this embodiment, the terminal may directly identify the authenticity of the terminal according to the identification information, rather than score the terminal hardware parameters, whereby an operation of identifying the authenticity of the terminal is simplified, and the verification efficiency of the terminal is improved.

It should be noted that, the secure element is an element already installed in the terminal, and the terminal may directly verify the terminal according to the existing secure element without installing the verification application program or additional elements in the terminal, whereby the verification cost of the terminal may be saved.

Accordingly, in the method of verifying the terminal provided by the present disclosure, by establishing the secure channel with the server through the secure element in the terminal, by sending the original terminal hardware parameters in the secure element to the server through the secure channel by using the secure element, the server being configured to feed back the identification information according to the terminal hardware parameters, and determining a verification result of an authenticity of the terminal according to the identification information fed back by the server, the terminal hardware parameters are initially parameters written into the secure element, and may not change with the degradation of the terminal performance, whereby the accuracy of the terminal hardware parameters is ensured, the problem that the verification application program cannot identify the authenticity of the terminal due to the degradation of the terminal performance is solved, and the effect that the accuracy of the authenticity of verifying the terminal is improved is achieved. In addition, the terminal hardware parameters may be directly read to identify the authenticity of the terminal without calculating the score of the terminal hardware parameters, whereby an operation of identifying the authenticity of the terminal is simplified, and the verification efficiency of the terminal is improved.

In addition, the terminal hardware parameters are written into the secure element before the terminal is originally started and the terminal hardware parameters are in a read-only state, so that the terminal hardware parameters in the secure element cannot be modified after the terminal is started, whereby the problem that the verification application program cannot identify the authenticity of the terminal since the terminal hardware parameters stored in the CPU of the terminal is maliciously modified may be solved, and the effect that the accuracy of the authenticity of verifying the terminal is improved is achieved.

Figure 3:
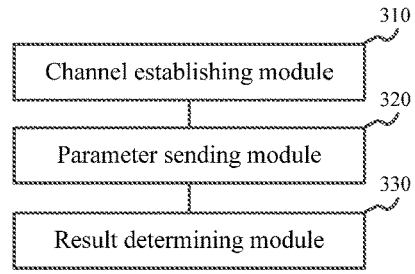
FIG. 3 is an example block diagram showing an apparatus of verifying a terminal according to an exemplary embodiment.

FIG. 3 is an example block diagram showing an apparatus of verifying a terminal according to an exemplary embodiment. The apparatus of verifying the terminal is applied in a terminal. As shown in FIG. 3, the apparatus of verifying the terminal includes: a channel establishing module 310, a parameter sending module 320 and a result determining module 330.

The channel establishing module 310 is configured to establish a secure channel with a server through a secure element in the terminal. The parameter sending module 320 is configured to send original terminal hardware parameters in the secure element to the server through the secure channel established by the channel establishing module by using the secure element, the server being configured to feed back identification information according to the terminal hardware parameters. The result determining module 330 is configured to determine a verification result of an authenticity of the terminal according to the identification information fed back by the server.

Accordingly, in the apparatus of verifying the terminal provided by the present disclosure, by establishing the secure channel with the server through the secure element in the terminal; sending the original terminal hardware parameters in the secure element to the server through the secure channel by using the secure element, the server being configured to feed back the identification information according to the terminal hardware parameters, and determining a verification result of an authenticity of the terminal according to the identification information fed back by the server, the terminal hardware parameters are initially written into the secure element, and may not change with the degradation of the terminal performance, whereby the accuracy of the terminal hardware parameters is ensured, the problem that the verification application program cannot identify the authenticity of the terminal due to the degradation of the terminal performance is solved, and the effect that the accuracy of the authenticity of verifying the terminal is improved is achieved. In addition, the terminal hardware parameters may be directly read to identify the authenticity of the terminal without calculating the score of the terminal hardware parameters, whereby an operation of identifying the authenticity of the terminal is simplified, and the verification efficiency of the terminal is improved.

Figure 4:
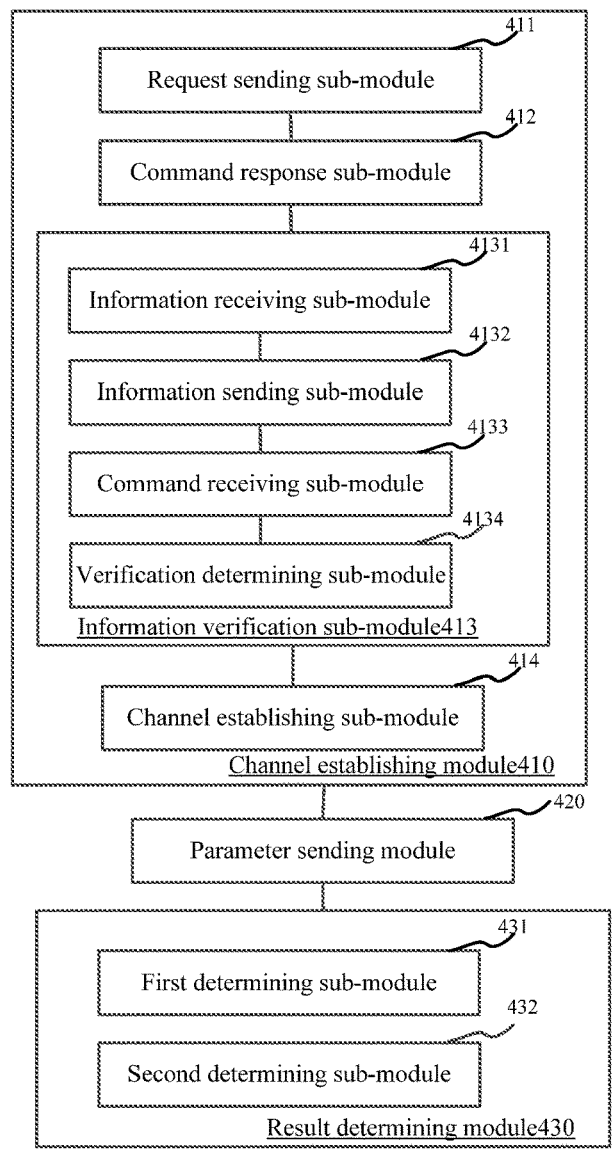
FIG. 4 is an example block diagram showing an apparatus of verifying a terminal according to an exemplary embodiment.

FIG. 4 is an example block diagram showing an apparatus of verifying a terminal according to an exemplary embodiment. The apparatus of verifying the terminal is applied in a terminal. As shown in FIG. 4, the apparatus of verifying the terminal includes: a channel establishing module 410, a parameter sending module 420 and a result determining module 430.

The channel establishing module 410 is configured to establish a secure channel with a server through a secure element in the terminal. The parameter sending module 420 is configured to send original terminal hardware parameters in the secure element to the server through the secure channel established by the channel establishing module by using the secure element, the server being configured to feed back identification information according to the terminal hardware parameters. The result determining module 430 is configured to determine a verification result of an authenticity of the terminal according to the identification information fed back by the server.

Alternatively, the terminal hardware parameters are written into the secure element before the terminal is originally started and the terminal hardware parameters are in a read-only state, where any edit to the secure element is disabled.

Alternatively or additionally, the result determining module 430 includes: a first determining sub-module 431 or a second determining sub-module 432. The first determining sub-module 431 is configured to compare the terminal hardware parameters with reference hardware parameters when the identification information include the terminal hardware parameters, and determine the verification result of the authenticity of the terminal according to a comparison result. The second determining sub-module 432 is configured to determine the verification result of the authenticity of the terminal according to the comparison result when the identification information include a comparison result generated by the server after comparing the terminal hardware parameters with the reference hardware parameters.

Alternatively or additionally, the channel establishing module 410 includes: a request sending sub-module 411, a command response sub-module 412, an information verification sub-module 413, and a channel establishing sub-module 414. The request sending sub-module 411 is configured to send a request for establishing a secure channel to the server through the secure element. The command response sub-module 412 is configured to receive a selection command sent by the server according to the request for establishing the secure channel sent by the request sending sub-module through the secure element, and respond to the selection command which is used to instruct the server to communicate with the secure element. The information verification sub-module 413 is configured to carry out a mutual verification with the server through the secure element. The channel establishing sub-module 414 is configured to establish the secure channel through the secure element after the information verification sub-module determines that the mutual verification is passed.

Alternatively or additionally, the information verification sub-module 413 includes: an information receiving sub-module 4131, an information sending sub-module 4132, a command receiving sub-module 4133, and a verification determining sub-module 4134. The information receiving sub-module 4131 is configured to receive a first verification information sent by the server through the secure element the first verification information including an initialization update command and a first key value. The information sending sub-module 4132 is configured to generate a second verification information after a verification of the first key value received by the information sending sub-module is passed by the secure element and send the second verification information to the server the second verification information comprising a card ciphertext and a second key value generated according to the initialization update command. The command receiving sub-module 4133 is configured to receive an external authentication command sent by the server through the secure element, the external authentication command carrying a host ciphertext which is generated and sent by the server after a verification of the card ciphertext and the second key value sent by the information sending sub-module is passed. The verification determining sub-module 4134 is configured to determine that the mutual verification between the secure element and the server is passed after a verification of the host ciphertext received by the command receiving sub-module is passed by the secure element.

Accordingly, in the apparatus of verifying the terminal provided by the present disclosure by establishing the secure channel with the server through the secure element in the terminal, sending the original terminal hardware parameters in the secure element to the server through the secure channel by using the secure element, the server is used to feed back the identification information according to the terminal hardware parameters, and determining a verification result of an authenticity of the terminal according to the identification information fed back by the server, the terminal hardware parameters are initially written into the secure element, and may not change with the degradation of the terminal performance, whereby the accuracy of the terminal hardware parameters is ensured, the problem that the verification application program cannot identify the authenticity of the terminal due to the degradation of the terminal performance is solved, and the effect that the accuracy of the authenticity of verifying the terminal is improved is achieved. In addition, the terminal hardware parameters may be directly read to identify the authenticity of the terminal without calculating the score of the terminal hardware parameters, whereby an operation of identifying the authenticity of the terminal is simplified, and the verification efficiency of the terminal is improved.

In addition, the terminal hardware parameters are written into the secure element before the terminal is originally started and the terminal hardware parameters are in a read-only state, so that the terminal hardware parameters in the secure element cannot be modified after the terminal is started, whereby the problem that the verification application program cannot identify the authenticity of the terminal due to the terminal hardware parameters stored in the CPU of the terminal may be maliciously modified, and the effect that the accuracy of the authenticity of verifying the terminal is improved is achieved.

With regard to the device in the above embodiment, detailed description of specific manner for conducting operation of modules has been made in the embodiment related to the method, and no detailed illustration will be made herein.

Figure 5:
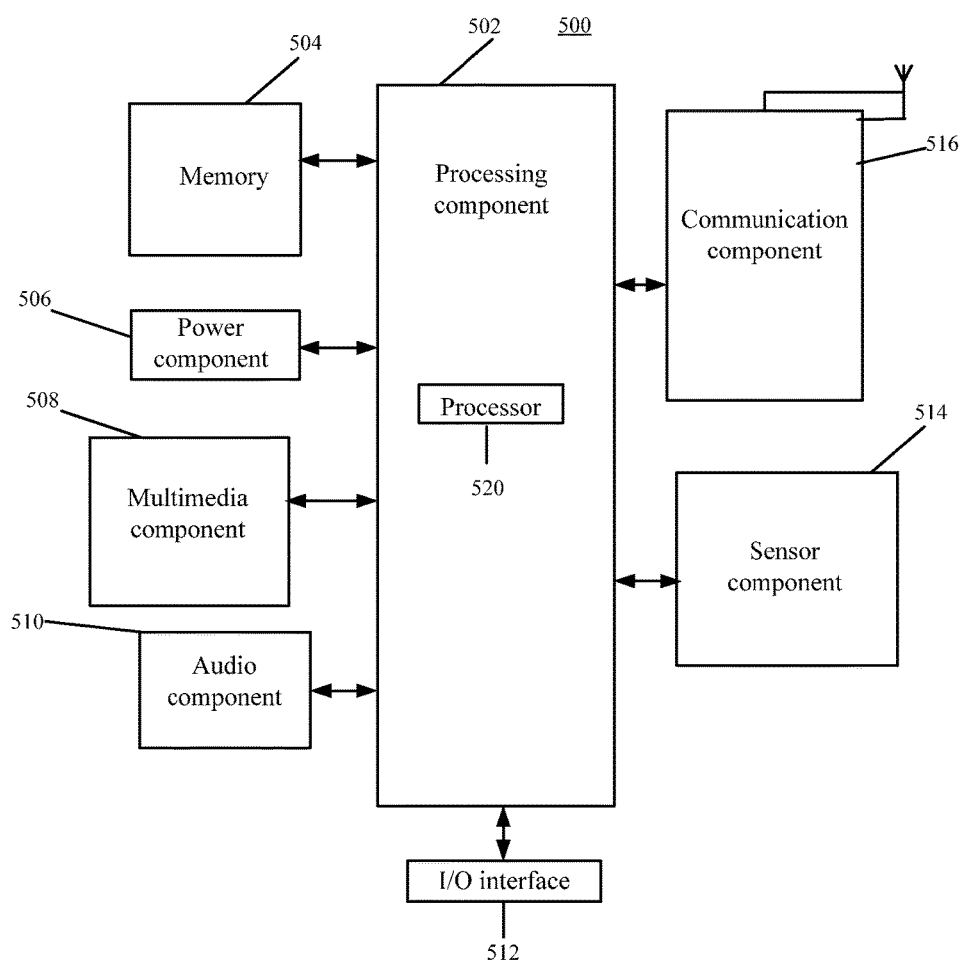
FIG. 5 is an example block diagram showing an apparatus for verifying a terminal according to an exemplary embodiment.

FIG. 5 is an example block diagram showing a device 500 for verifying a terminal according to an exemplary embodiment. For example, the device 500 may be a mobile phone, a computer, a digital broadcast terminal, a messaging device, a gaming console, a tablet, a medical device, exercise equipment, a personal digital assistant (PDA) and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 usually controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any application or method operated on the device 500, contact data, phonebook data, messages, pictures, videos, etc. The memory 504 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the device 500 is in an operation mode, such as a call mode, a recording mode, and a voice identification mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, a button, and the like. The button may include, but not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keyboard, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 may access a wireless network based on a communication standard, such as WI-FI, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In the embodiments, there is also provided a non-transitory computer readable storage medium including instructions, such as included in the memory 504, executable by the processor 518 in the device 500, for performing the above method. For example, the non-transitory computer-readable storage medium may be a ROM, a random access memory (RAM), a CD-ROM, a magnetic tape, a floppy disc, an optical data storage device, and the like.

The methods, devices, and modules described above may be implemented in many different ways and in many different combinations of hardware and software. For example, all or parts of the implementations may be circuitry that includes an instruction processor, such as a CPU, microcontroller, or a microprocessor; or as an ASIC, PLD, or FPGA; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

After considering this description and carrying out the embodiments disclosed herein, those skilled in the art may easily anticipate other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A method for verifying a terminal, comprising:
    writing terminal hardware parameters into a secure element in the terminal before an operating system is loaded to the terminal, wherein the secure element comprises a secure card;
    establishing a secure channel with a server through the secure element in the terminal after mutual authentication by performing the following steps:
        receiving a selection command from the server according to a request for establishing the secure channel through the secure element, and responding to the selection command, the selection command being configured to instruct the server to communicate with the secure element;
        receiving a first verification information from the server through the secure element, the first verification information including an initialization update command and a first key value;
        generating a second verification information after a verification of the first key value is passed by the secure element, and sending the second verification information to the server, the second verification information including a card ciphertext and a second key value generated according to the initialization update command;
        receiving an external authentication command from the server through the secure element, the external authentication command carrying a host ciphertext that is generated and sent from the server after a verification of the card ciphertext and the second key value is passed; and
        determining that mutual verification between the secure element and the server is satisfied after verification of the host ciphertext by the secure element;
    sending the terminal hardware parameters in the secure element to the server through the secure channel, wherein the terminal hardware parameters are stored in memory of the terminal and comprise a model number, a serial number, and an International Mobile Equipment Identity (IMEI) number, and the terminal has no authority to read the terminal hardware parameters, wherein the server is configured to feed back identification information according to the terminal hardware parameters; and
    determining a verification result of an authenticity of the terminal according to the identification information fed back by the server.

2. The method according to claim 1, further comprising:
    setting the terminal hardware parameters in a read-only state when the terminal hardware parameters are written into the secure element of the terminal before the operating system is loaded.

3. The method according to claim 1, wherein determining the verification result of an authenticity of the terminal according to the identification information comprises:
    when the identification information comprise the terminal hardware parameters, comparing the terminal hardware parameters with reference hardware parameters, and determining the verification result of the authenticity of the terminal according to a comparison result.

4. The method according to claim 1, wherein determining the verification result of an authenticity of the terminal according to the identification information comprises:
    when the identification information comprises a comparison result generated by the server after the server compares the terminal hardware parameters with reference hardware parameters, determining the verification result of the authenticity of the terminal according to the comparison result generated by the server.

5. An apparatus of verifying a terminal, comprising:
    a processor; and
    a memory for storing instructions executable by the processor;
    wherein the processor is configured to:
        write terminal hardware parameters into a secure element in the terminal before an operating system is loaded to the terminal, wherein the secure element comprises a secure card;

establish a secure channel with a server through the secure element in the terminal after mutual authentication by performing the following steps:
receiving a selection command from the server according to a request for establishing the secure channel through the secure element, and responding to the selection command, the selection command being configured to instruct the server to communicate with the secure element;
receiving a first verification information from the server through the secure element, the first verification information including an initialization update command and a first key value;
generating a second verification information after a verification of the first key value is passed by the secure element, and sending the second verification information to the server, the second verification information including a card ciphertext and a second key value generated according to the initialization update command;
receiving an external authentication command from the server through the secure element, the external authentication command carrying a host ciphertext that is generated and sent from the server after a verification of the card ciphertext and the second key value is passed; and
determining that mutual verification between the secure element and the server is satisfied after verification of the host ciphertext by the secure element;
send the terminal hardware parameters in the secure element to the server through the secure channel, wherein the terminal hardware parameters are stored in memory of the terminal and comprise a model number, a serial number, and an International Mobile Equipment Identity (IMEI) number, and the terminal has no authority to read the terminal hardware parameters, wherein the server being is configured to feed back identification information according to the terminal hardware parameters; and
determine a verification result of an authenticity of the terminal according to the identification information fed back by the server.

6. The apparatus according to claim 5, wherein the terminal hardware parameters are set in a read-only state when the terminal hardware parameters are written into the secure element of the terminal before the operating system is loaded.

7. The apparatus according to claim 5, wherein determining the verification result of an authenticity of the terminal according to the identification information fed back by the server comprises:
when the identification information comprise the terminal hardware parameters, comparing the terminal hardware parameters with reference hardware parameters, and determining the verification result of the authenticity of the terminal according to the comparison result.

8. The apparatus according to claim 5, wherein determining the verification result of an authenticity of the terminal according to the identification information fed back by the server comprises:
when the identification information comprises a comparison result generated by the server after the server compares the terminal hardware parameters with the reference hardware parameters, determining the verification result of the authenticity of the terminal according to the comparison result generated by the server.

9. A non-transitory computer readable storage medium, when instructions in the storage medium are executed by the processor of a terminal, the terminal may execute acts for verifying the terminal, the acts comprising:
writing terminal hardware parameters into a secure element in the terminal before an operating system is loaded to the terminal, wherein the secure element comprises a secure card;
establishing a secure channel with a server through the secure element in the terminal after mutual authentication by performing the following steps:
receiving a selection command from the server according to a request for establishing the secure channel through the secure element, and responding to the selection command, the selection command being configured to instruct the server to communicate with the secure element;
receiving a first verification information from the server through the secure element, the first verification information including an initialization update command and a first key value;
generating a second verification information after a verification of the first key value is passed by the secure element, and sending the second verification information to the server, the second verification information including a card ciphertext and a second key value generated according to the initialization update command;
receiving an external authentication command from the server through the secure element, the external authentication command carrying a host ciphertext that is generated and sent from the server after a verification of the card ciphertext and the second key value is passed; and
determining that mutual verification between the secure element and the server is satisfied after verification of the host ciphertext by the secure element;
sending the terminal hardware parameters in the secure element to the server through the secure channel, wherein the terminal hardware parameters are stored in memory of the terminal and comprise a model number, a serial number, and an International Mobile Equipment Identity (IMEI) number, and the terminal has no authority to read the terminal hardware parameters, wherein the server is configured to feed back identification information according to the terminal hardware parameters; and
determining a verification result of an authenticity of the terminal according to the identification information fed back by the server.

10. The non-transitory computer readable storage medium according to claim 9, the acts further comprising:
setting the terminal hardware parameters are in a read-only state when the terminal hardware parameters are written into the secure element of the terminal before the operating system is loaded.

11. The non-transitory computer readable storage medium according to claim 9, wherein determining the verification result of an authenticity of the terminal according to the identification information fed back by the server comprises:
when the identification information comprise the terminal hardware parameters, comparing the terminal hardware parameters with reference hardware parameters, and determining the verification result of the authenticity of the terminal according to a comparison result.

12. The non-transitory computer readable storage medium according to claim 9, wherein determining the verification result of an authenticity of the terminal according to the identification information fed back by the server comprises:

When the identification information comprises a comparison result generated by the server after the server compares the terminal hardware parameters with the reference hardware parameters, determining the verification result of the authenticity of the terminal according to the comparison result generated by the server.

* * * * *